July 5, 1932.  C. E. ROSENDAHL  1,865,790
MOORING MAST
Filed April 24, 1930   3 Sheets-Sheet 1

INVENTOR
CHARLES E. ROSENDAHL
BY Harold Dodd,
ATTORNEY

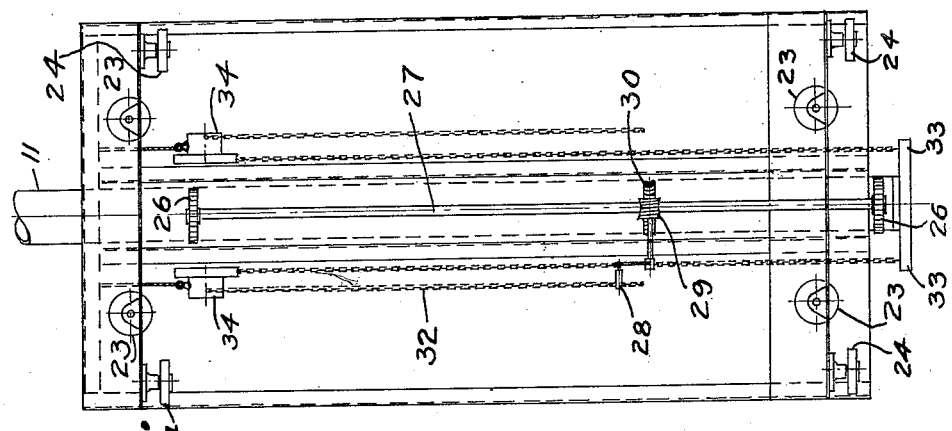
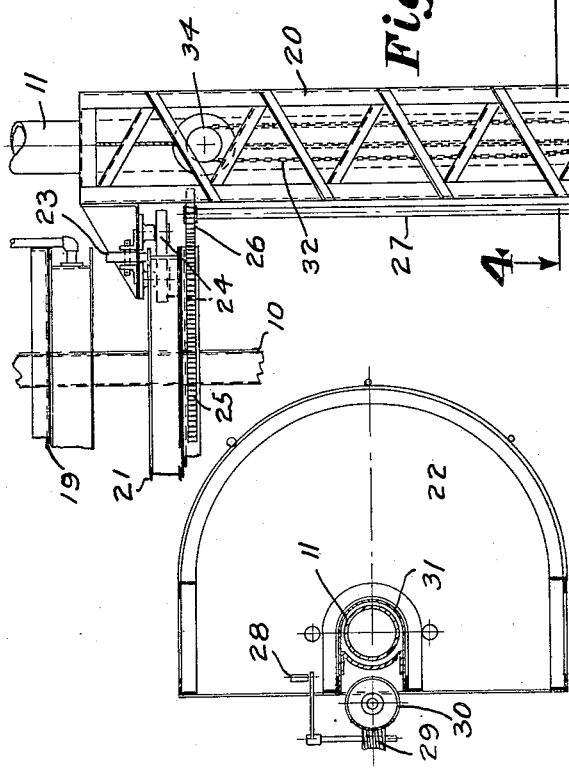
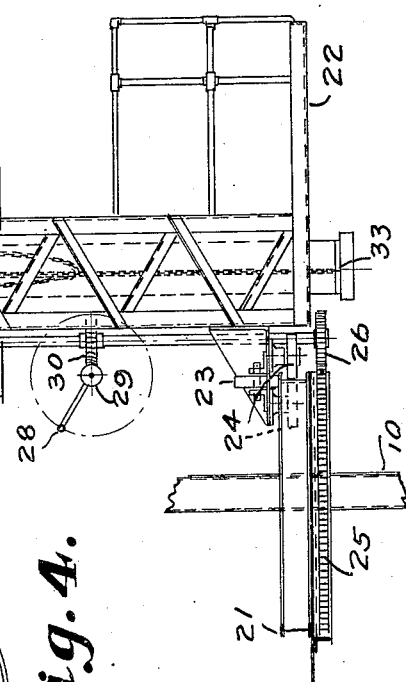

July 5, 1932.  C. E. ROSENDAHL  1,865,790
MOORING MAST
Filed April 24, 1930   3 Sheets-Sheet 3
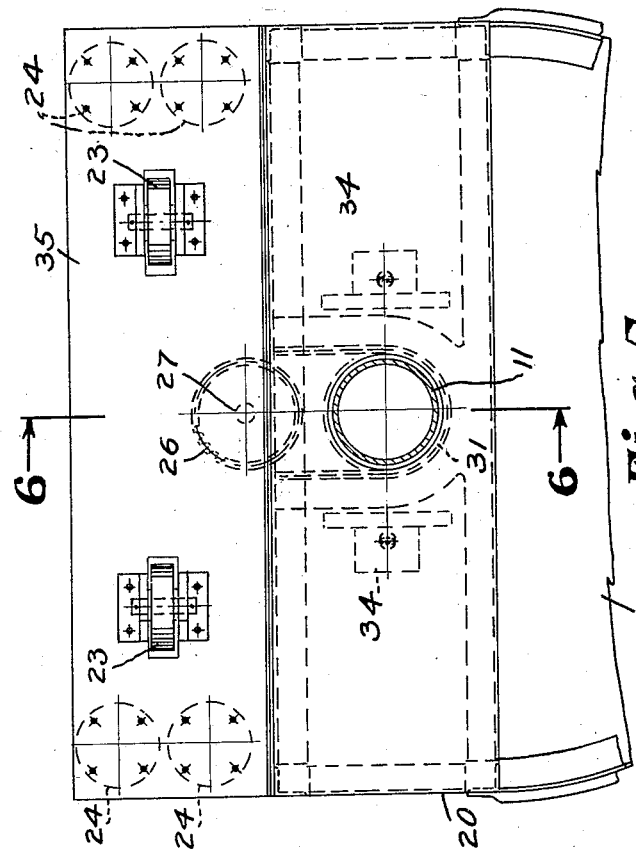
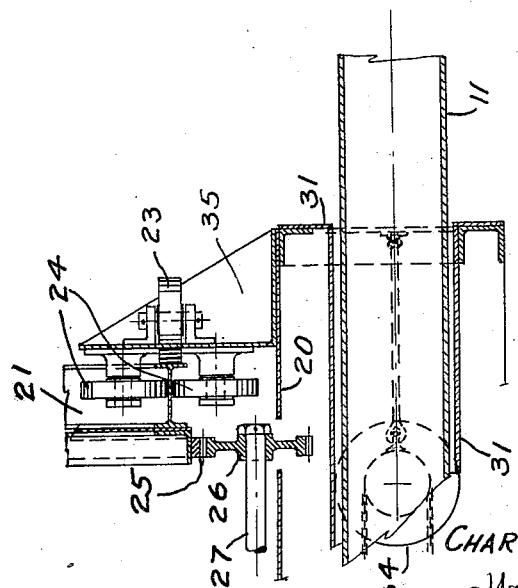
INVENTOR
CHARLES E. ROSENDAHL
BY Harold Dodd ATTORNEY Patented July 5, 1932

1,865,790

UNITED STATES PATENT OFFICE

CHARLES E. ROSENDAHL, OF WASHINGTON, DISTRICT OF COLUMBIA

MOORING MAST

Application filed April 24, 1930. Serial No. 447,073.

(GRANTED UNDER THE ACT OF MARCH 3, 1883, AS AMENDED APRIL 30, 1928; 370 O. G. 757).

My invention relates broadly to a mooring mast for aircraft and more particularly to the operating mechanism thereof.

An object of the invention resides in the construction of a mooring mast having an adjustable auxiliary top-mast that may be so positioned after the aircraft has been moored that the aircraft may swing in azimuth without damage from the mast.

Another object of the invention is the provision of a top guy to be attached to the bow of the aircraft and by means of which the mooring officer can control the vertical position of the aircraft.

A further object of the invention embodies the provision of an auxiliary top-mast that not only is adjustable longitudinally of the mast proper, but one that also may be moved in azimuth about the mast.

When an aircraft is being moored to a mast it is necessary that such aircraft be capable of being moved in very small increments both horizontally and vertically. The means heretofore provided make possible such small increments in the horizontal direction, but fail to provide means for the necessary movement in the vertical direction. Heretofore there has been no mooring means capable of exerting a force on the aircraft having a substantial component in the upward direction, thereby not only allowing nicety of adjustment but also opposing the downward drag of the stays. Such means, however, must not endanger the aircraft particularly during the approach and preliminary stages of the mooring or when swinging in azimuth after being completely moored. The provision of such means is an object of my invention.

With the above and other objects in view the invention consists in the construction, combination and arrangement of parts as will be described more fully hereinafter.

Reference is to be had to the accompanying drawings forming a part of this specification in which like reference characters indicate corresponding parts throughout the several views and in which—

Figure 3 is a front elevational view of the inner surface of the carriage, as illustrated in Figure 2;

Figure 4 is a sectional view on the line 4—4 of Figure 2;

Figure 5 is a top plan view of Figure 3 with the platform broken away;

Figure 6 is a sectional view on the line 6—6 of Figure 5; and

Figure 7 illustrates the operating mechanism for the top guy.

Figure 1:
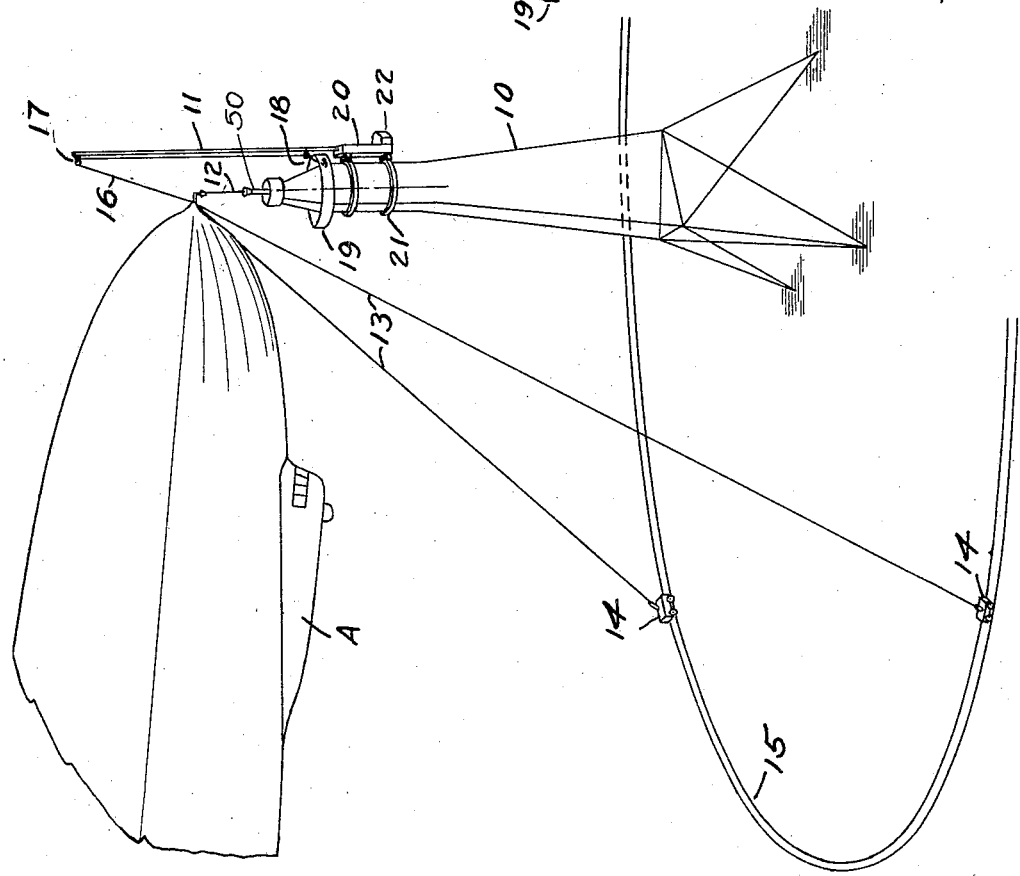
Figure 1 is a general view of my mooring mast with an aircraft in the process of being moored thereto.

Referring more particularly to Figure 1 of the drawings, A indicates an aircraft that is in the process of being anchored to a mooring mast 10 by means of a top mast 50 and a second or auxiliary top-mast 11 which is adjustable both in longitude and azimuth. The aircraft is held by the main mooring cable 12 and side yaw guys 13, the latter being connected with cars 14 operable over a circular ground track 15 adjacent to the base of the main mast 10. A top guy 16, that passes over a sheave 17 at the upper end of the auxiliary top-mast 11, also assists in the anchorage of the aircraft. The purpose of the top guy is to provide a means whereby during the last stages of the mooring operation, the bow of the aircraft can be held up against a down current of air or other atmospheric disturbance and against the down-pull of the other mooring cables which lead from the aircraft to the ground and to the mooring mast. It also provides a means whereby the mooring officer can control the vertical position of the aircraft thus materially aiding the final operation of seating the aircraft's mooring cone in the mast cup. The top guy, which, as stated above, leads up to a sheave 17 attached to the top of the auxiliary top-mast 11 and thence downwardly to a drum 18 located at the operating platform 19, is made fast to the bow of the aircraft during the mooring operation. At the drum the slack is taken in or the guy is payed out as is necessary. The top guy is supported by the auxiliary top-mast 11 which when erected extends to a point considerably above the topmast 50 of the mooring mast proper. The auxiliary top-mast 11 is capable of being moved vertically up and down and is mounted on and supported by a carriage 20 capable of being moved in azimuth around the main mast on suitable tracks 21. It is so made that it may be lowered to a point beneath the top of the main mast when it is in stowed position, also that it may be lowered in order that it will not interfere with the aircraft as it swings in azimuth after being completely moored. A further reason for having the auxiliary top-mast 11 adjustable is the desirability of erecting it after the mooring operation has begun, in order to avoid the danger of the aircraft overriding the mast and fouling the auxiliary top-mast 11 during the preliminary mooring operation. The auxiliary top-mast 11 is supported by the traveling carriage 20 in order that it may always be erected on the side of the main mast opposite to that from which the aircraft is approaching. A platform 22 is provided for the necessary personnel to operate the mechanism on the travelling carriage.

Figure 2:
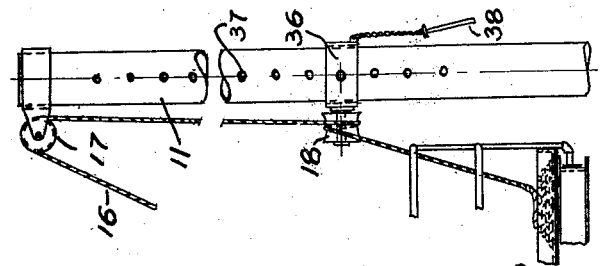
Figure 2 is a side view of the movable support for the auxiliary top mast showing a part of the tracks over which it travels.

Referring to Figures 2, 3, and 4, the travelling carriage 20 is supported on the tracks 21 by vertically disposed rollers 23 and horizontally disposed rollers 24, as will be described more fully in connection with Figures 5 and 6. Just below the tracks 21 and supported by the main mast, are two stationary geared racks 25 with which pinions 26 engage. A shaft 27, suitably mounted in bearings fixed to the carriage, carries the pinions at its ends, the pinions being so fixed to the shaft that they turn with it. A crank 28, conveniently located to the personnel on the carriage platform, imparts movement to the shaft through a worm 29 engaging with a worm gear 30 fixed to the shaft. The rotation of the shaft causes the pinions to be turned over the geared racks moving the carriage 20 in azimuth around the main mast.

The auxiliary top-mast 11 slides in a tubular guideway 31, more clearly seen in Figure 4, and is raised or lowered by chains 32 readily accessible to the personnel on the carriage platform. One end of the chains is made fast to the base of the auxiliary top mast 11, as at 33, while the other end is secured to self-locking ratchet pulleys 34, with their intermediate portions looped about the pulleys, that are suspended from the upper portion of the carriage, as shown. By proper manipulation of the chains, the auxiliary top mast may be placed at any desired height within its limits, whereby the mooring of the aircraft is facilitated. Although two chains are shown in the drawings, there may be but one, or even more than two, if desired, depending on the weight of the auxiliary top mast and other mechanical conditions encountered.

As may be seen in Figures 5 and 6, particularly in Figure 6, and as above stated, the movable carriage is supported on tracks 21 by suitable rollers. The tracks are preferably substantially of I-beam construction. The rollers are journaled in bearings supported by brackets 35, that are mounted on the carriage 20. The vertical rollers 23 run on the top of the tracks, and support the weight of the carriage, and the horizontal rollers 24 operate on either side of the I-beam to prevent the carriage from moving horizontally, assuring positive engagement of the pinions 26 with the geared racks 25.

Figure 7 depicts the manner of fastening the drum 18 to an auxiliary top mast so that it may be maintained approximately in a position convenient to the personnel in the platform 19 irrespective of the height of the auxiliary top mast 11. The drum is attached to the auxiliary top mast by a collar 36 slidable therealong. A series of holes 37 extends longitudinally of the auxiliary top mast for the reception of a locking pin 38 that passes through an opening in the collar and is seated in any desired one of the holes 37 to hold the collar, and hence the drum, in its adjusted position.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

The herein described invention may be manufactured and used by or for the Government of the United States for governmental purposes without the payment to me of any royalty thereon.

Having described my invention, what I claim is:

1. A mooring mast including a main mast, and an auxiliary top-mast adjustable longitudinally and in azimuth with respect to the main mast.

2. A mooring mast including a main mast, a carriage adjustably supported thereon, and an auxiliary top-mast mounted on the carriage.

3. A mooring mast including a main mast having a top mast, an adjustable auxiliary mast, a top guy carried by the auxiliary mast, and a movable means for supporting the auxiliary mast.

4. A mooring mast including a main mast having a top mast, a platform fixed thereto, an adjustable auxiliary top-mast, a carriage adjustable in azimuth around the main mast and supporting the auxiliary top-mast, guide tracks on the main mast, means on the carriage engaging the tracks, and means for propelling the carriage over the tracks.

5. A mooring mast including a main mast, a carriage movable in azimuth around the mast, and an auxiliary top-mast supported on the carriage and adjustable longitudinally.

6. A mooring mast including a main mast having a top-mast, an auxiliary or secondary top-mast longitudinally adjustable with respect to the main mast, a carriage movable in azimuth around the main mast and supporting the auxiliary top-mast, guideways on the main mast for the carriage, racks on the main mast, and a propelling means on the carriage engaging with the racks for moving the carriage over the guideway.

7. A mooring mast including a main mast having a top-mast, an auxiliary or secondary top-mast longitudinally adjustable with respect to the main mast, guide tracks on the main mast, a carriage movable in azimuth around the main mast on the tracks, brackets attached to the carriage, rollers supporting the carriage on the tracks, rollers engaging the tracks to prevent lateral movement of the carriage, means for imparting movement to the top-mast, and means for moving the carriage around the top-mast.

8. In combination with an aircraft and a mooring mast, means upon said mooring mast for exerting upon said aircraft a force having a substantial component vertically upward, said means consisting of an auxiliary or secondary mast.

9. A mooring mast including a main mast having a top-mast, and a secondary mast movably secured to said main mast.

10. A mooring mast including a main mast having a top-mast, a secondary mast and means movably securing said secondary mast to the main mast whereby the secondary mast can be adjusted longitudinally and in azimuth with respect to the main mast.

CHARLES E. ROSENDAHL.